Figures 1, 2, 3, 4, 5:
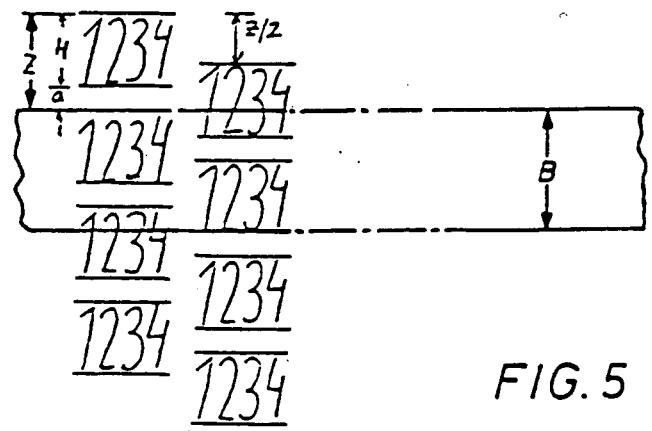

United States Patent [19]

Scholtysik

[11] Patent Number: 5,039,131
[45] Date of Patent: Aug. 13, 1991

[54] ADHESIVE SEALING STRIP, PRINTED WITH IDENTIFICATION FEATURES, FOR RECORDING MATERIALS

[75] Inventor: Bernd Scholtysik, Munich, Fed. Rep. of Germany

[73] Assignee: Agfa Gevaert Aktiengesellschaft, Leverkusen, Fed. Rep. of Germany

[21] Appl. No.: 510,520

[22] Filed: Apr. 18, 1990

[30] Foreign Application Priority Data

May 2, 1989 [DE] Fed. Rep. of Germany ....... 3914432

[51] Int. Cl.⁵ ............................................. B42D 15/00
[52] U.S. Cl. ....................................... 283/62; 283/81; 283/117
[58] Field of Search ............................ 283/62, 81, 117

[56] References Cited

U.S. PATENT DOCUMENTS

| | | | |
|---|---|---|---|
| 1,632,030 | 6/1927 | Martin | 283/62 |
| 4,609,208 | 9/1986 | Wrobel | 283/81 |
| 4,889,367 | 12/1989 | Miller | 283/81 X |
| 4,893,840 | 1/1990 | Berkowitz | 283/81 |

FOREIGN PATENT DOCUMENTS 1159546 6/1958 France ................................ 283/81

OTHER PUBLICATIONS

*IBM Technical Disclosure Bulletin;* "Multicolor Easily Printable Bar Code"; Jones, J. E., vol. 14, No. 3, p. 783, 8-71.
*Research Disclosure;* #21431; Feb. 1982, p. 51, "Film Cassette with Identification Label".

*Primary Examiner*—Paul A. Bell
*Attorney, Agent, or Firm*—Connolly & Hutz

[57] ABSTRACT

An adhesive sealing strip for coiled or spooled recording materials, such as rolls of magnetic tape, in which the identification features, such as casting numbers, are clearly legible, is obtained by printing the features on an adhesive tape over the entire width of the web in lines one above the other and at the same time side by side in columns, each following column being offset vertically relative to the preceding column by a specific amount, whereupon the recording material is cut to the desired useful width. In this manner, a maximum height of printing of the identification features can be achieved in which the symbols are clearly legible (FIG. 3).

8 Claims, 1 Drawing Sheet

U.S. Patent

Aug. 13, 1991

5,039,131

```
649 6903 145 1
649 6903 145 1
649 6903 145 1
649 6903 145 1
649 6903 145 1
649 6903 145 1
649 6903 145 1
649 6903 145 1
649 6903 145 1
649 6903 145 1
649 6903 145 1
649 6903 145 1
649 6903 145 1
649 6903 145 1
```

ADHESIVE SEALING STRIP, PRINTED WITH IDENTIFICATION FEATURES, FOR RECORDING MATERIALS

The invention relates to an adhesive sealing strip, printed with identification features, for web-like recording materials and stuck to at least one location of the web over the entire useful width thereof, the identification features being printed parallel to the length of the web and the web-like recording material being cut into strips longitudinally.

In the manufacture of recording materials, such as photographic films, papers or magnetic tapes, webs of from 60 to 240 cm in width and of different lengths are usually produced by applying the photographic or magnetic coatings and possibly backings to a flexible coating material in one or more working operations in a casting machine. The recording materials are cut to useable width in cutting machines after drying and possibly calendering, and are wound in the desired length onto flangeless winding cores or reels. The end of the tape is usually stuck to the reel by means of an adhesive sealing strip.

It is also known to print production codes, such as type of film or magnetic tape, casting machine, time of casting, tape number and the like on the adhesive sealing strip, the identification features being numbers, letters, bar codes or the like. The printing on the adhesive sealing strips is usually done with suitable printers, such as matrix printers or thermotransfer printers, before the cutting operation. This method does not present any difficulties in the case of wide strips, such as tapes cut to half inch (12.7 mm) or miniature film width (35 mm). However, if, for example, magnetic tapes are to be cut to a width of 3.81 mm, the difficulty arises that, due to the small width of the strip, and despite a small size of type, the printed adhesive tape has to be positioned so accurately on the web before the cutting operation that the printing on the individual strips remains legible after the tapes have been cut, that is to say, the printing is not cut. It will be appreciated that this is very difficult to perform, and a satisfactory result could only be achieved in this method if the line spacing of the printing corresponds exactly to the width of the cut strips. FIG. 1 shows an example of this type of printing in which individual adhesive sealing strips of the roll of tape are only poorly legible after the cutting operation, as is clearly shown in FIG. 2.

Therefore, the task arose of finding an adhesive sealing strip of the kind mentioned initially, in which
  its identification features are legible even when it is cut into narrow strips,
  the height of the identification features is to be as large as possible,
  the vertical line spacing of the identification features is not necessarily to be equal to the width of the strip.

In accordance with the invention, this object was achieved with a printed adhesive sealing strip having the features set forth in the characterising part of claim 1. Further details of the invention follow from the subclaims, the description and the drawings.

In the drawings attached for explanation of the invention:

FIG. 1 shows adhesive sealing strips with printed identification features on a web-like recording material in accordance with the prior art, FIG. 2 shows adhesive sealing strips as in FIG. 1, with recording materials cut to useful width, FIG. 3 shows adhesive sealing strips with identification features in accordance with the present invention on a web-like recording material, FIG. 4 shows adhesive sealing strips in accordance with FIG. 3, but after the recording material has been cut longitudinally into narrow strips, FIG. 5 is a diagrammatic representation of the geometry of the identification features in accordance with FIG. 3 and FIG. 4.

The essence of the invention resides in printing the same identification features in lines one above the other and at the same time in successive columns, each column being offset in height by $$\frac{1}{n}$$

of the vertical line spacing relative to the preceding column, and the maximum height of the identification features on the adhesive sealing strip being $$H_{max} = n/(n+1) \times (B - a/n)$$

in which:
  n = number of columns of printing
  B - width of strip of the recording material
  a = free distance between 2 printed lines (in a row)
  = line spacing Z - height of printing H As will be stated again further below, the line spacing Z by no means has to be identical to the width B of the strip of the cut recording material. The geometrical relationships for n=2 are shown in FIG. 5.

The invention will be explained by way of example with reference to the production of 3.81 mm wide strips of magnetic tape such as are used in compact cassettes, without limiting the invention thereto.

A finished cast and after-treated web of magnetic tape of approximately 65 cm in width and of great length, coming from a dispensing device, runs through a cross-cutting device known from the prior art.

By way of example, the cross-cutting device may comprise a cutting table across which a cutting wheel is guided at right angles to the direction in which the web of magnetic tape is running, so that the web is cut. The two ends of the web, which may possibly be spaced from one another by a few millimeters or centimeters, are then joined to one another over their entire width by an adhesive tape. As is shown in FIG. 3, this adhesive tape has identification features located one above the other over the entire extent of its web. In accordance with the present invention, these identification features are provided in two identical columns, the second column being offset vertically relative to the first column by ½ line spacing. After the described adhesive joint has been produced, a defined length of the web is further wound off until the desired length of the roll is obtained, and the next adhesive joint is made in the manner already described above. The web provided with adhesive joints in this manner runs through a longitudinal cutting device, also known from the prior art, in which rotating blades cut the web into 3.81 mm wide strips which are subsequently wound onto flangeless winding cores or flanged reels by applying or sticking the start of the strip to each core or each reel and, after taking up the predetermined length, sticking the end of the tape with the adhesive sealing strip in accordance with the invention. In order to facilitate the subsequent removal of the adhesive sealing strip by the customer, one or both ends of the adhesive sealing strip may be free from adhesive and bent at an obtuse angle. As will be seen from FIG. 4, in contrast to the prior art (FIG. 2), the identification feature on each roll of tape can be clearly distinguished.

In the case illustrated, the web is cut into approximately 170 strips, so that it may be advantageous to mark the roll numbers for subsequent identification of the individual rolls of tape, this being done in the present case (FIG. 3 and FIG. 4) by the last sequence of digits. The following sizes were chosen in this connection: B=3.81 mm, a=0.5 mm.

Hence, in accordance with the above-mentioned formula, the maximum possible height of printing of the identification features at which a line of print on the roll of magnetic tape is always fully visible is:

$$H_{max} = 2/3 \; B - a\tfrac{1}{2} = 2.37 \; mm$$

The line spacing is $$Z = H + a = 2.87 \; mm$$

The second column is displaced by $\tfrac{1}{2} Z$ relative to the first column. It follows from these specifications of size that, with the present invention, it is by no means necessary for the width B of the strip to be equal to the line spacing Z.

It will be appreciated that it is also possible, within the scope of the invention, to print the identification features in three or more columns, each column in this case being offset vertically by $\tfrac{1}{3}$ relative to the preceding one, and so on. The maximum printing height increases as the number of columns printed side by side increases, as will be seen from a comparison of printed identification features in one, two or three rows respectively.

With a=0.5 mm and B=3.81 mm:
$H_{max} = 1.65$ in the case of one row
$H_{max} = 2.37$ in the case of two rows
$H_{max} = 2.73$ in the case of three rows.

We claim:

1. An adhesive sealing strip, provided with identification features by printing, for web-like recording material and stuck to at least one location of the web over the entire usable width thereof, the identification features being printed parallel to the length of the web, and the web-like recording material being cut into strips longitudinally, characterised in that the identification features are disposed in lines one above the other and in n columns adjacent to one another, each column being offset vertically relative to the preceding column by the n portion of the line spacing, and the height of the identification features being $$H \leq n/(n+1) X (B - a/n)$$

in which:
n = number of printed columns
B = width of strip of the recording material
a = free distance between two printed lines in a row
   = line spacing Z - height of printing H 2. An adhesive sealing strip as claimed in claim 1, characterised in that the identification features are disposed side by side in two columns, the second column being offset vertically relative to the first column by the distance of half a line in each case.

3. An adhesive sealing strip as claimed in claim 2, characterised in that the web-like recording material is cut at right angles to the direction in which it runs, the ends of the web, possibly spaced from one another, are joined by means of an adhesive tape which includes the identification features in lines and columns, whereupon the web is cut longitudinally into narrow strips.

4. An adhesive sealing strip as claimed in claim 1, characterised in that the identification features are disposed in three columns, each column being offset vertically relative to the preceding column by $\tfrac{1}{3}$ of the line spacing in each case.

5. An adhesive sealing strip as claimed in claim 4, characterised in that the web-like recording material is cut at right angles to the direction in which it runs, the ends of the web, possibly spaced from one another, are joined by means of an adhesive tape which includes the identification features in lines and columns, whereupon the web is cut longitudinally into narrow strips.

6. An adhesive sealing strip as claimed in claim 1, characterised in that the web-like recording material is cut at right angles to the direction in which it runs, the ends of the web, possibly spaced from one another, are joined by means of an adhesive tape which includes the identification features in lines and columns, whereupon the web is cut longitudinally into narrow strips.

7. An adhesive sealing strip as claimed in claim 6, characterised in that the identification features are numbers, letters or bar codes and are applied to the adhesive sealing strip by printing.

8. An adhesive sealing strip as claimed in claim 1, characterised in that the identification features are numbers, letters or bar codes and are applied to the adhesive sealing strip by printing.

* * * * *